(12) United States Patent
Hiratsuka et al.

(10) Patent No.: US 7,624,228 B2
(45) Date of Patent: Nov. 24, 2009

(54) DISK DRIVE AND METHOD OF CONTROLLING CACHE MEMORY THEREIN

(75) Inventors: Yukie Hiratsuka, Kanagawa (JP); Manabu Nishikawa, Kanagawa (JP); Hiroaki Inoue, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 452 days.

(21) Appl. No.: 11/477,746

(22) Filed: Jun. 28, 2006

(65) Prior Publication Data

US 2007/0005884 A1 Jan. 4, 2007

(30) Foreign Application Priority Data

Jun. 30, 2005 (JP) ............................. 2005-191297

(51) Int. Cl.
G06F 13/00 (2006.01)
(52) U.S. Cl. ...................................... 711/113
(58) Field of Classification Search ........................ None
See application file for complete search history.

(56) References Cited

U.S. PATENT DOCUMENTS

2004/0205296 A1* 10/2004 Bearden ..................... 711/129

FOREIGN PATENT DOCUMENTS

JP 2002-108704 A 4/2002

* cited by examiner

Primary Examiner—Reginald G Bragdon
Assistant Examiner—Eric Loonan
(74) Attorney, Agent, or Firm—Townsend and Townsend and Crew LLP; Patrick Duncan

(57) ABSTRACT

A processing speed is improved when there is a pattern in which read requests making access to continuous areas in an LBA space repeatedly alternate with write requests making access to continuous or non-continuous areas in the LBA space. In one embodiment, when the pattern in which read requests making access to continuous areas in an LBA space repeatedly alternate with write requests making access to continuous or non-continuous areas in the LBA space is extracted or a notice that the pattern has occurred is given from a host, write data required by write requests is buffered while executing read requests, and when this buffering of the write data is started, the position at which write data is started to be written is set to a position where the capacity of the buffered write data maximizes, taking account of the ratio of the amount of data transferred to a cache memory during reading to the amount of data transferred to the cache memory during writing.

5 Claims, 20 Drawing Sheets

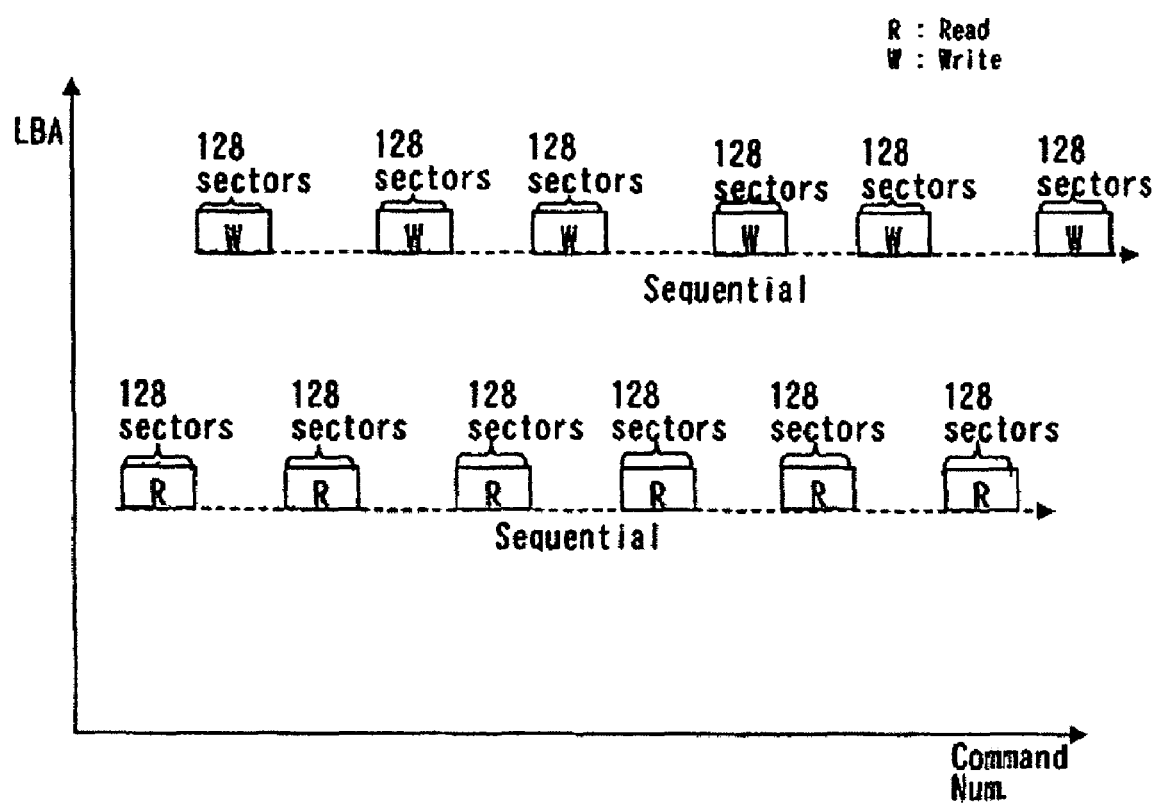

| Number of times that fundamental pattern is extracted | Amount of data transferred on read commands during extraction of fundamental pattern (number of sectors) | Amount of data transferred during writing in fundamental pattern (number of sectors) |
|---|---|---|
| 1 | 128 | 256 |
| 2 | 128 | 246 |
| : | : | : |
| N+1 | 128 | 200 |

Fig. 17

| Register | 7 | 6 | 5 | 4 | 3 | 2 | 1 | 0 |
|---|---|---|---|---|---|---|---|---|
| Features | 8Bh ||||||||
| Sector Count | 00h (End) or 01h (Start) ||||||||
| LBA Low | Transfer ratio of write |||| Transfer ratio of read ||||
| LBA Mid | na ||||||||
| LBA High | na ||||||||
| Device | obs | na | obs | DEV. Num. | na | na | na | na |
| Command | EFh ||||||||

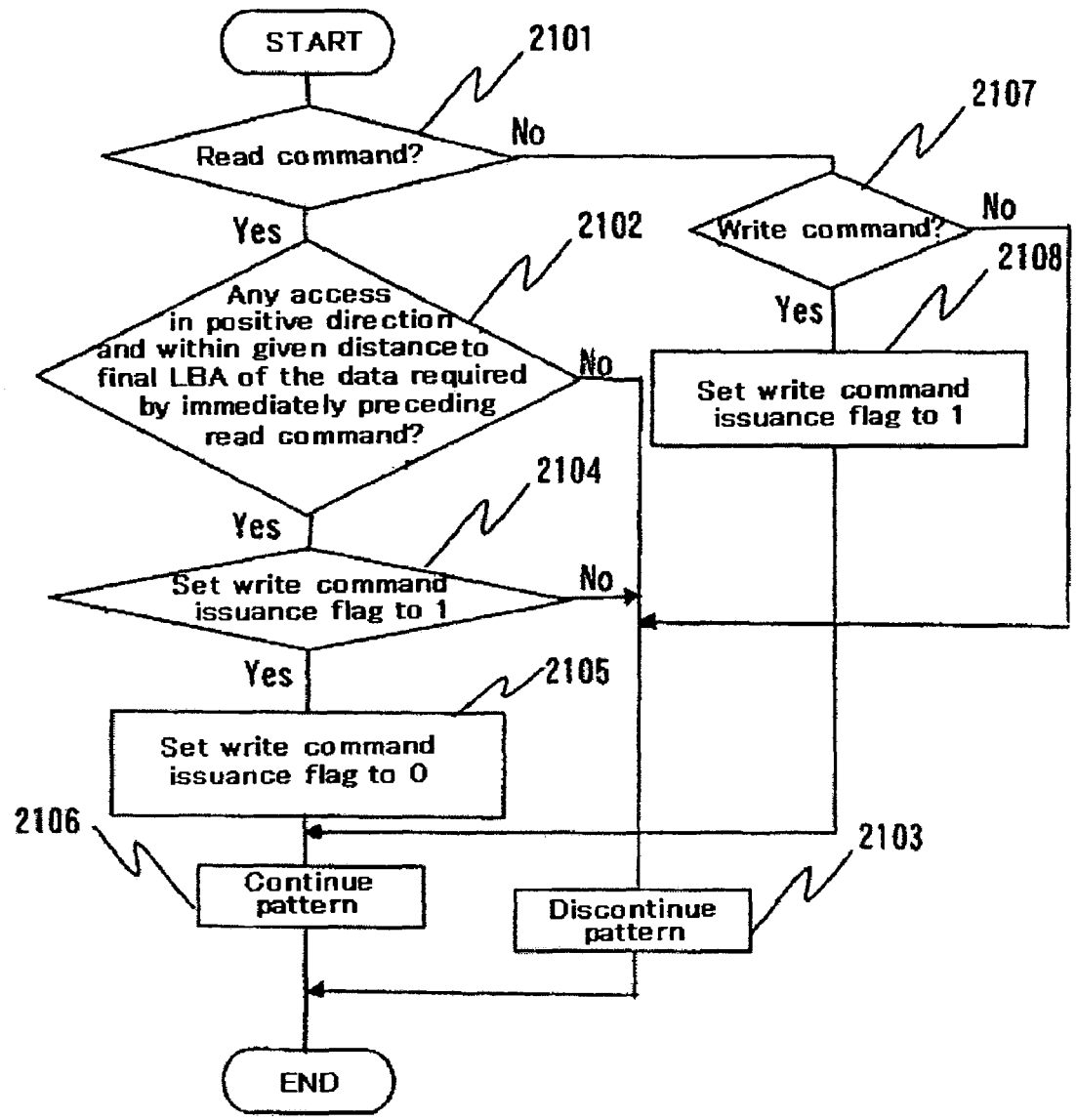

Fig. 25

| Number of times that fundamental pattern is extracted | Sum (number of sectors) of amount of data required by read commands during extraction of fundamental pattern and amount of data previously read until that amount of data is read out | Amount of data transferred during writing in fundamental pattern (number of sectors) |
|---|---|---|
| 1 | 255 | 256 |
| 2 | 222 | 246 |
| : | : | : |
| N + 1 | 200 | 200 |

DISK DRIVE AND METHOD OF CONTROLLING CACHE MEMORY THEREIN

CROSS-REFERENCES TO RELATED APPLICATIONS

This application claims priority from Japanese Patent Application No. JP2005-191297, filed Jun. 30, 2005, the entire disclosure of which is incorporated herein by reference.

BACKGROUND OF THE INVENTION

The present invention relates to a single-ring cache control method for setting areas for reading and writing, respectively, on a cache as required according to the circumstances of access and for storing read data and write data.

The cache memory of a disk drive has a function of storing data items which are highly likely to be accessed in response to a following read command. The cache memory has a second function of storing write data transferred from a host.

A disk drive is usually equipped with one cache memory which is used to realize the aforementioned two functions. To use the cache memory efficiently, it is necessary to use the two functions properly according to the requirement from the host side at all times.

A dual ring method is available as a cache control method for realizing the two functions. This dual ring method consists of setting an area dedicated for reading and an area dedicated for writing on the cache memory and writing read data and write data into the two dedicated areas, respectively. A single ring method is also available. This method consists of setting an area for reading and an area for writing on the cache memory as demands arise according to the circumstances of access and storing read data and write data.

A further method described in patent reference 1 (JP-A-2002-108704) is also available. In particular, a cache control method is implemented that is adapted for a pattern of processing requests in which read requests alternate with write requests such as copy processing. Where an instruction for realizing this pattern of processing requests is given from a host, the cache control method is switched to a method adapted for the pattern of processing requests.

BRIEF SUMMARY OF THE INVENTION

In the dual ring method, the area dedicated for reading and the area dedicated for writing are fixedly set and so there is the problem that the whole cache area cannot be effectively utilized in a case where only read requests continue or in a case where only write requests continue. Furthermore, if the used system responds to the processing request, the ratio between the areas assigned to reading and writing, respectively, becomes unsuitable. Consequently, the processing efficiency deteriorates.

In the single ring method, cache areas are used as areas for reading or areas for writing according to the processing request at all times. If the request alternates frequently between read and write requests, the processing efficiency deteriorates.

In the technique described in patent reference 1, the cache control is optimized at all times in response to a certain request but a method of consisting of reassigning the cache areas during execution of the processing is not adopted. Hence, the cache areas are not fully utilized.

It is a first feature of the present invention to provide a single-segment method capable of setting areas for reading and writing, respectively, as the need arises. This method is characterized in that it can provide a higher processing speed in cases where read requests making access to continuous areas in an LBA (logical block address) space repeatedly alternate with write requests making access to continuous or non-continuous areas in the LBA space.

It is a second feature of the invention to provide a single-segment method capable of setting areas for reading and writing, respectively, as the need arises, the method being further characterized in that the method provides a higher processing speed in cases where read requests making access to areas existing within a certain distance in the positive direction of the LBAs repeatedly alternate with write requests making access to continuous or non-continuous areas in the LBA space.

The first and second features described above are provided by a single ring method capable of setting areas for reading and writing, respectively, whenever the need arises. The method has the following characteristics. Write data required by a write request is buffered while executing a read request. When the buffering of the write data is started, the position at which the write data is started to be written is set so as to maximize the capacity of the buffered write data, taking account of the ratio of the amount of data transferred to a cache memory during reading to the amount of data transferred to the cache memory during writing.

In cases where read requests making access to continuous areas in the LBA space repeatedly alternate with write requests making access to continuous or non-continuous areas in the LBA space, if the amount of data transferred for reading making access to continuous areas in the LBA space is larger than or equal to the amount of data transferred for writing making access to continuous or non-continuous areas in the LBA space, the position at which data is started to be written for writing is set equal to the position at which data is started to be written for reading. If the amount of data transferred for reading making access to continuous areas in the LBA space is smaller than the amount of data transferred for writing making access to continuous or non-continuous areas in the LBA space, the position at which data is started to be written for writing is set to a position that is obtained by subtracting an amount corresponding to the cache capacity×(1−the amount of data transferred for reading/the amount of data transferred for writing) from the position at which data is started to be written for reading.

Where read requests making access to space areas which are within a given distance in the positive direction of the LBAs repeatedly alternate with write requests making access to continuous or non-continuous areas in the LBA space, if the total amount of data previously read up to the address specified by the host and the amount specified by the host is larger than or equal to the amount of data transferred in response to a write request, the write and read requests are set equal in start position of data writing. If the sum of the amount of data previously read up to the address specified by the host and the amount of data required by the host is smaller than the amount of data transferred in response to a write request, the position at which data is started to be written for writing is set to a position obtained by subtracting an amount corresponding to the cache capacity×(1−the total amount of data transferred by the reading/the amount of data transferred by the writing) from the position at which data is started to be written for reading.

Furthermore, at the beginning of a read request, those of the cache areas which are once assigned to reading and in which read data already transferred to the host are recorded are released as areas for writing. However, where read requests making access to a space located within a given distance in the positive direction of the LBAs repeatedly alternate with write requests making access to continuous or non-continuous areas in the LBA space, areas in which data previously read until the data is read out has been recorded are also released as areas for writing, in addition to areas in which read data already transferred to the host has been recorded.

According to the present invention, the processing speed can be improved where the processing request pattern is a first processing request pattern or a second processing request pattern. In the first processing request pattern, read requests making access to continuous areas in the LBA space repeatedly alternate with write requests making access to continuous or non-continuous areas in the LBA space. In the second processing request pattern, read requests making access to space areas located within a given distance in the positive direction of the LBAs repeatedly alternate with write requests making access to continuous or non-continuous areas in the LBA space.

BRIEF DESCRIPTION OF THE DRAWINGS

FIG. 13 is a flowchart illustrating a sequence of operations for extracting a pattern of processing requests to which cache control according to the first embodiment is applied;

FIG. 17 is a table of examples of commands for making a notice from a host to a disk drive that cache control according to the first embodiment should be applied to the pattern of processing requests;

FIG. 21 is a flowchart illustrating a sequence of operations for making a decision as to whether a pattern of processing requests utilizing cache control according to the second embodiment persists;

FIG. 22 is a flowchart illustrating a sequence of operations for calculating a distance which is given by the number of sectors and which provides a basis for making a decision as to whether a pattern of processing requests utilizing cache control according to the second embodiment persists;

FIG. 25 is a table showing an example of the configuration of an amount of transferred data management table for managing the amount of transferred data in the fundamental pattern of patterns of processing requests to which cache control according to the second embodiment is applied.

DETAILED DESCRIPTION OF THE INVENTION

Figure 1:
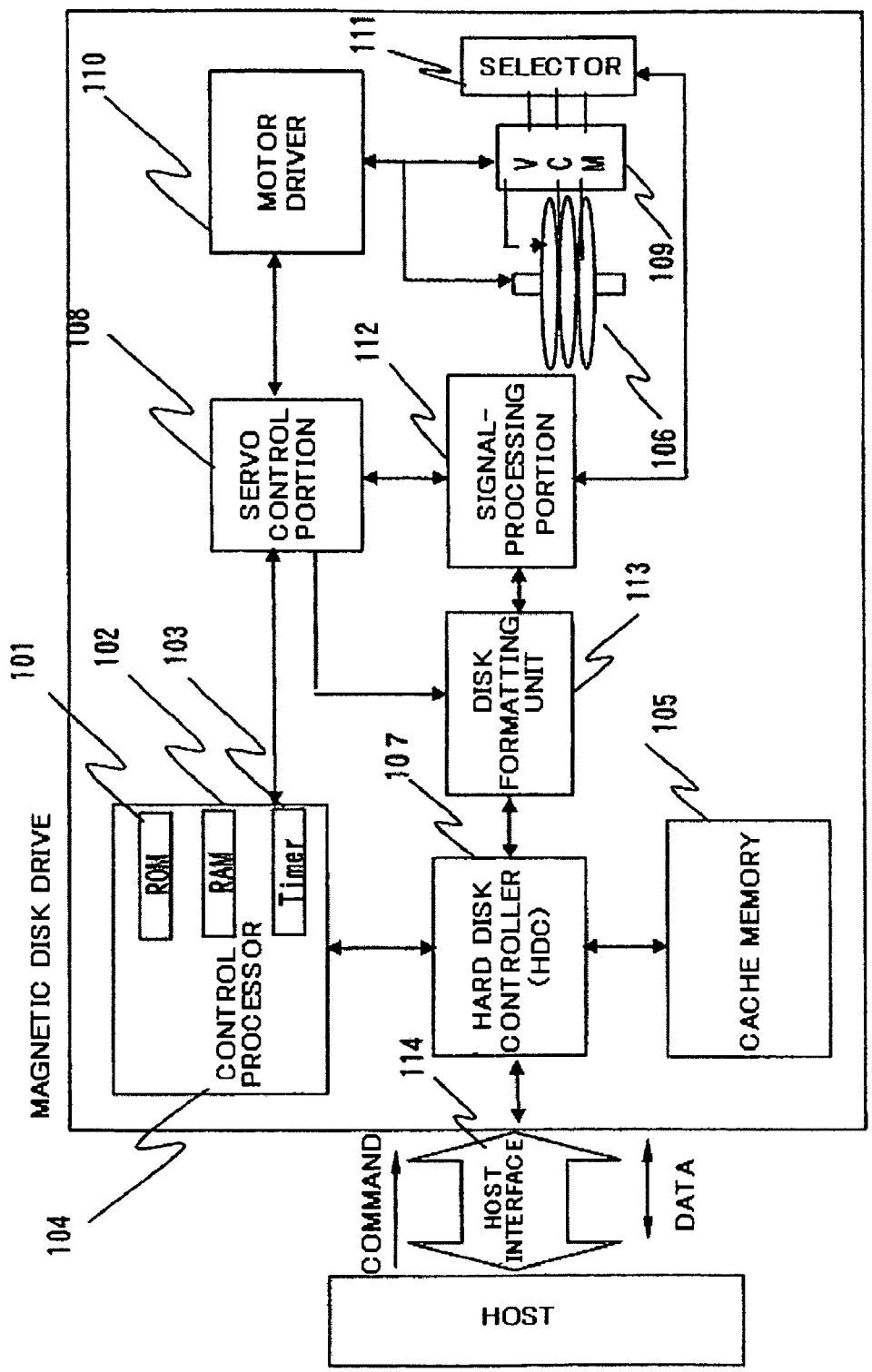
FIG. 1 is a block diagram of the configuration of a magnetic disk drive according to one embodiment of the present invention.

The configuration of a magnetic disk drive according to one embodiment of the present invention is shown in FIG. 1. The disk drive has a program ROM 101 loaded with a control program, a RAM 102 for storing a table for managing data inside a cache memory and data principally regarding cache areas, a timer 103 for managing and setting the time set inside the disk drive, a control processor 104 incorporating the ROM 101, RAM 102, and timer 103 and acting to read in the control program from the ROM and to execute the program, the cache memory 105 for temporarily writing read request data and write request data, a hard disk controller (HDC) 107 for controlling transfer of data between a host and the cache 105 and between the cache 105 and a magnetic disk 106, a servo control portion 108 for providing control to move the head to a specified position when data is read or written, a voice coil motor (VCM) 109 for moving the head according to an instruction from the servo control portion 108, a motor driver 110 for controlling rotation of the disk 106, a selector 111 for selecting only a signal about the head specified by the magnetic signal read in from the head, a signal-processing portion 112 for converting analog data sent from the selector 111 into digital data and converting digital data sent from the hard disk controller 107 into analog data, a disk formatting unit 113 acting to route read data sent from the signal processing portion 112 to the cache 105 by opening and closing a gate for reading and to route write data transferred from the cache 105 to the signal processing portion 112 by opening and closing a gate for writing, and an interface control portion 114 for receiving and sending commands (processing requests) and data.

One aspect of the present invention is to improve the processing speed in a case where read requests making access to continuous areas in the LBA space repeatedly alternate with write requests making access to continuous or non-continuous areas in the LBA space in the single segment method capable of setting areas for reading and writing, respectively, as the need arises. An example of request for processing by the host utilizing cache control according to the first embodiment of the present invention is shown in FIGS. 2 and 3, where the logical block address (LBA) on the disk is plotted on the vertical axis and the command issuance number is on the horizontal axis.

Figure 2:
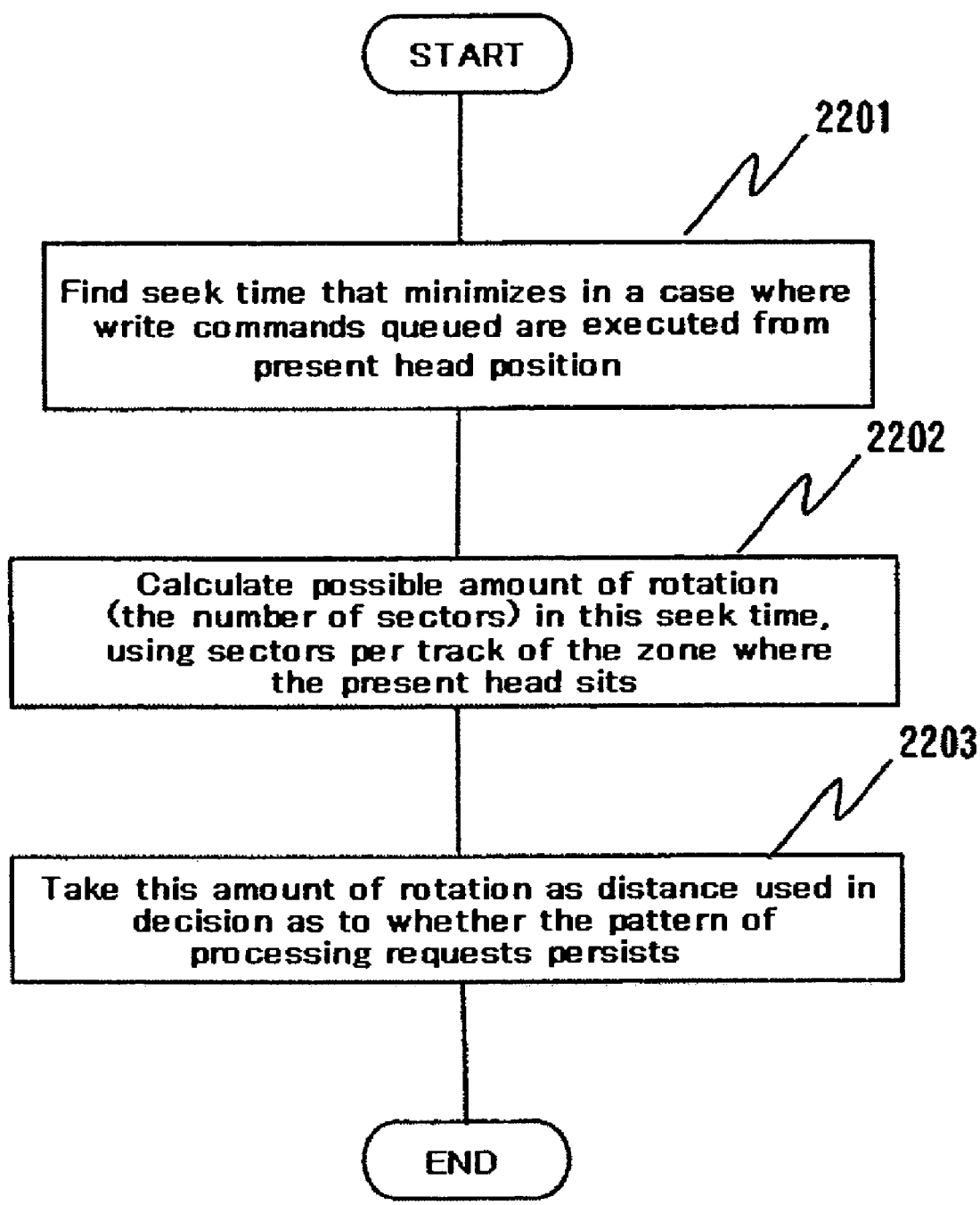
FIG. 2 is a diagram illustrating an example of a pattern of processing requests to which cache control according to a first embodiment of the invention is applied.

In the example of FIG. 2, read commands R and write commands W are alternately issued. Requests using the read commands R and requests using the write commands W are accesses to continuous areas in the LBA space. Each of the read commands R and write commands W requests transfer of data having a size of 128 sectors.

Figure 3:
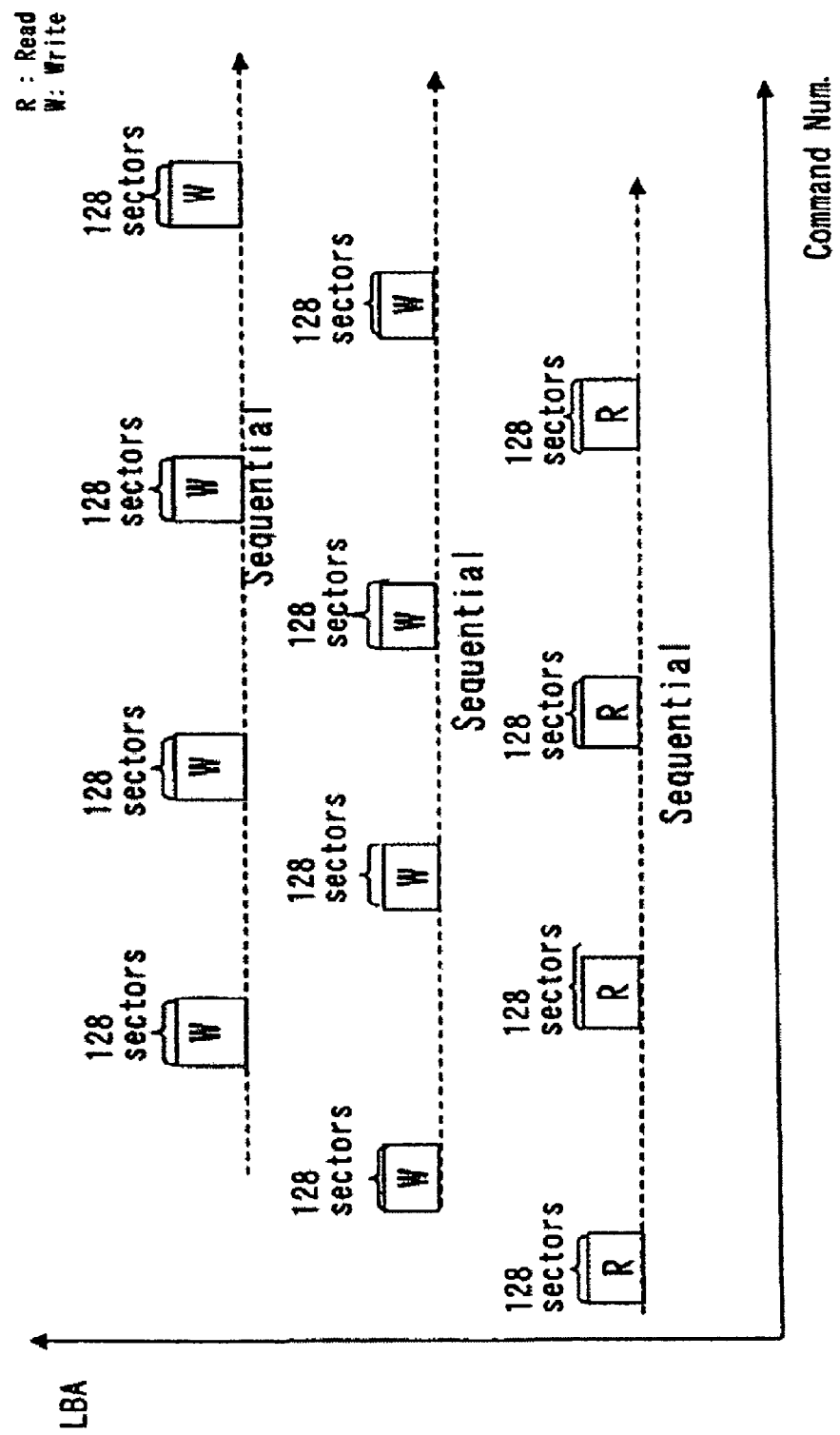
FIG. 3 is a diagram illustrating another example of a pattern of processing requests to which the cache control according to the first embodiment is applied.

In the example of FIG. 3, two write commands W are issued after a read command R. In the same way as in the example of FIG. 2, request by the read command R and requests by the write commands W are accesses to continuous areas in the LBA space. Also, each of the read command R and write commands W requests transfer of data having a size of 128 sectors.

Of the features of the processing requests described above, the features of processing requests to which the cache control of the present embodiment is applied are that processing requests presented by a series of read commands are accesses to continuous areas in the LBA space and that a write command is issued between the read commands. Processing requests caused by write commands do not need to be requests for making access to continuous areas. Furthermore, it is not necessary that read and write commands be identical in size of required transfer of data.

An example of processing that provides a pattern of processing requests shown in FIGS. 2 and 3 is copying. Generally, an audiovisual (AV) content has a large size and so if it is stored on a disk unit, data is often written in continuous areas. Where an AV content is recorded while playing back another AV content, the processing requests also assume a pattern as shown in FIGS. 2 and 3. Processing of AV contents is real-time processing. In many mobile devices, data is stored in the internal cache memory, and data is read out or written by spinning up the disk drive only when the cache is full of data to some extent (during recording) or when the cache is emptied of data to some extent (during playback), for saving electric power. Therefore, it is not always necessary to take account of the real-timeliness during processing of commands when AV contents are recorded or played back.

In the cache control of the present embodiment, reading is executed in preference to writing. Writing of all write data onto the disk is executed in one operation after a sequence of read operations. Accordingly, when buffered write data is written, delay is induced in a reading operation performed immediately thereafter. However, when AV contents are recorded and played back as described previously, time limitations are not always imposed on execution of commands. Therefore, it is unlikely that the cache control of the present embodiment cannot be applied to the case where recording and playback of AV contents are done simultaneously.

Figure 4:
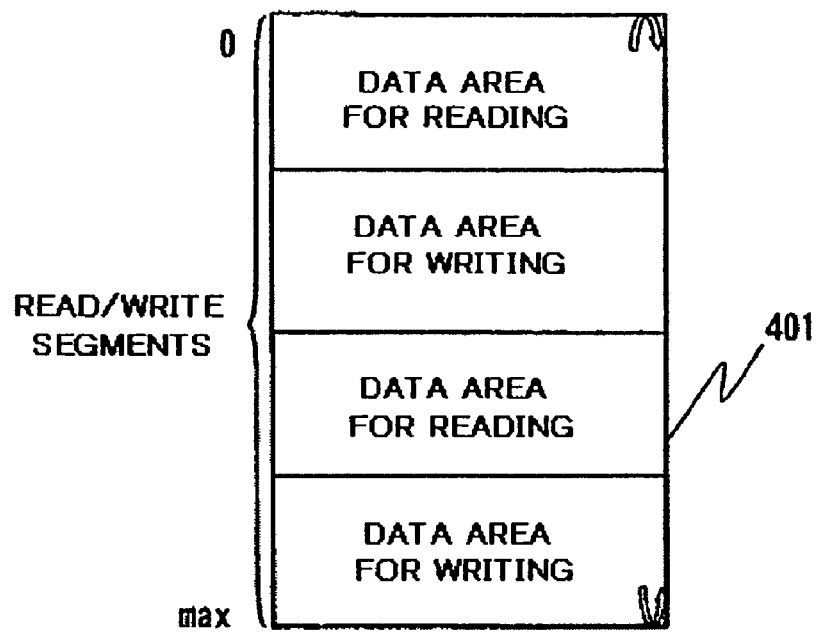
FIG. 4 is a diagram illustrating a related art cache control operation of the single ring type capable of setting areas for reading and writing, respectively, whenever the need arises.

FIG. 4 shows an example of the case where processing requests as shown in FIG. 2 or 3 are carried out under the related art single-ring cache control. Write data on the cache needs to be retained on the cache until the data is written into the disk. Therefore, the single-ring cache control needs to prevent write data not yet written onto the disk from being overwritten.

On the other hand, during reading, data other than data required by the host is preread and transferred to the cache. Generally, prereading is executed by making use of either the time taken until the host issues the next command or rotation wait time occurring when processing of a read command received during prereading is executed precisely. Therefore, it is generally impossible to forecast the total amount of previously read data. However, in some cases, a write command is received during prereading. Therefore, when prereading is executed, a protective mechanism for preventing overwriting of write data is necessary.

Because of the necessity described above, in the related art single-ring cache control, the maximum amount of previously read data is determined prior to the start of prereading. The position at which write data is started to be written is set to a position where the write data is not overwritten by previously read data. Therefore, in response to the pattern of processing requests shown in FIGS. 2 and 3, areas for reading and areas for writing have been alternately set under the related art single-ring cache control as shown in FIG. 4. In the example of FIG. 4, if the control is so provided that the amount of buffered write data is maximized, there is the problem that write data cannot be buffered at least in the second read data area 401.

Figure 5:
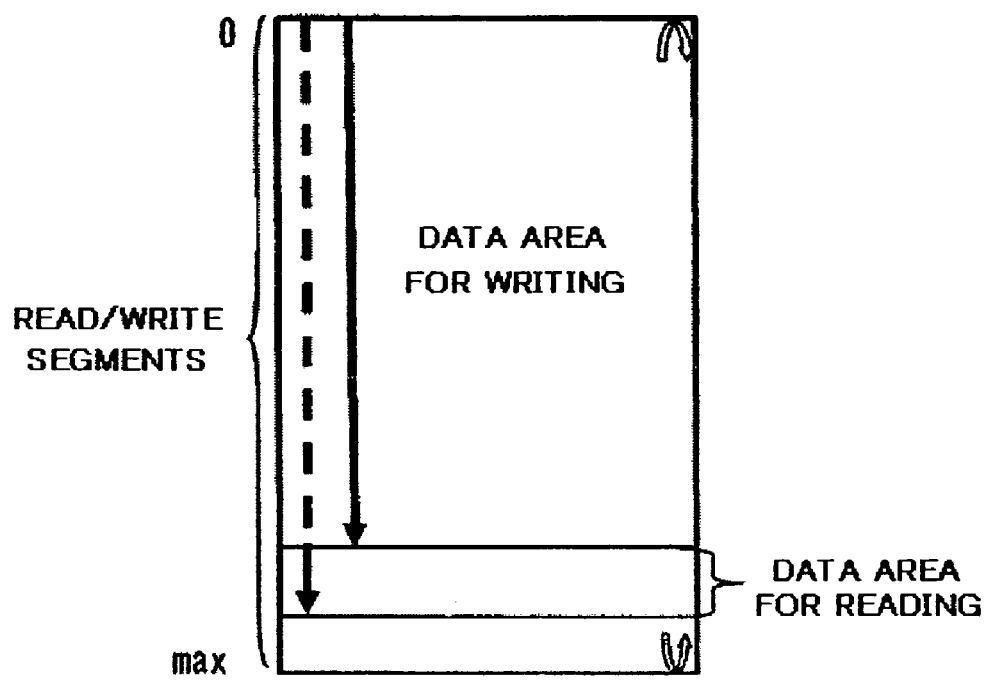
FIG. 5 is a diagram illustrating the position at which cached data is started to be written in accordance with the first embodiment.

An example of cache control of the present embodiment is shown in FIG. 5. Under the cache control of the present embodiment, in a case where read requests making access to continuous areas in the LBA space repeatedly alternate with write requests making access to continuous or non-continuous areas in the LBA space as shown in FIGS. 2 and 3, the position at which write data is started to be written is so set that read data can be overwritten with write data at all times and that the total amount of write data buffered at the time when all the read data previously read has been transferred to the host is maximized. The example of FIG. 5 is an operation under cache control performed on the pattern of requests shown in FIG. 2 in which read requests and write requests are equal in capacity of transferred data. Therefore, the position at which read data is started to be written is identical with the position at which write data is started to be written. The great difference with the control illustrated in FIG. 4 is that the position where write data is started to be written is set to a position where all read data can be overwritten with write data. Consequently, the capacity of bufferable write data can be increased to a maximum.

Figure 6:
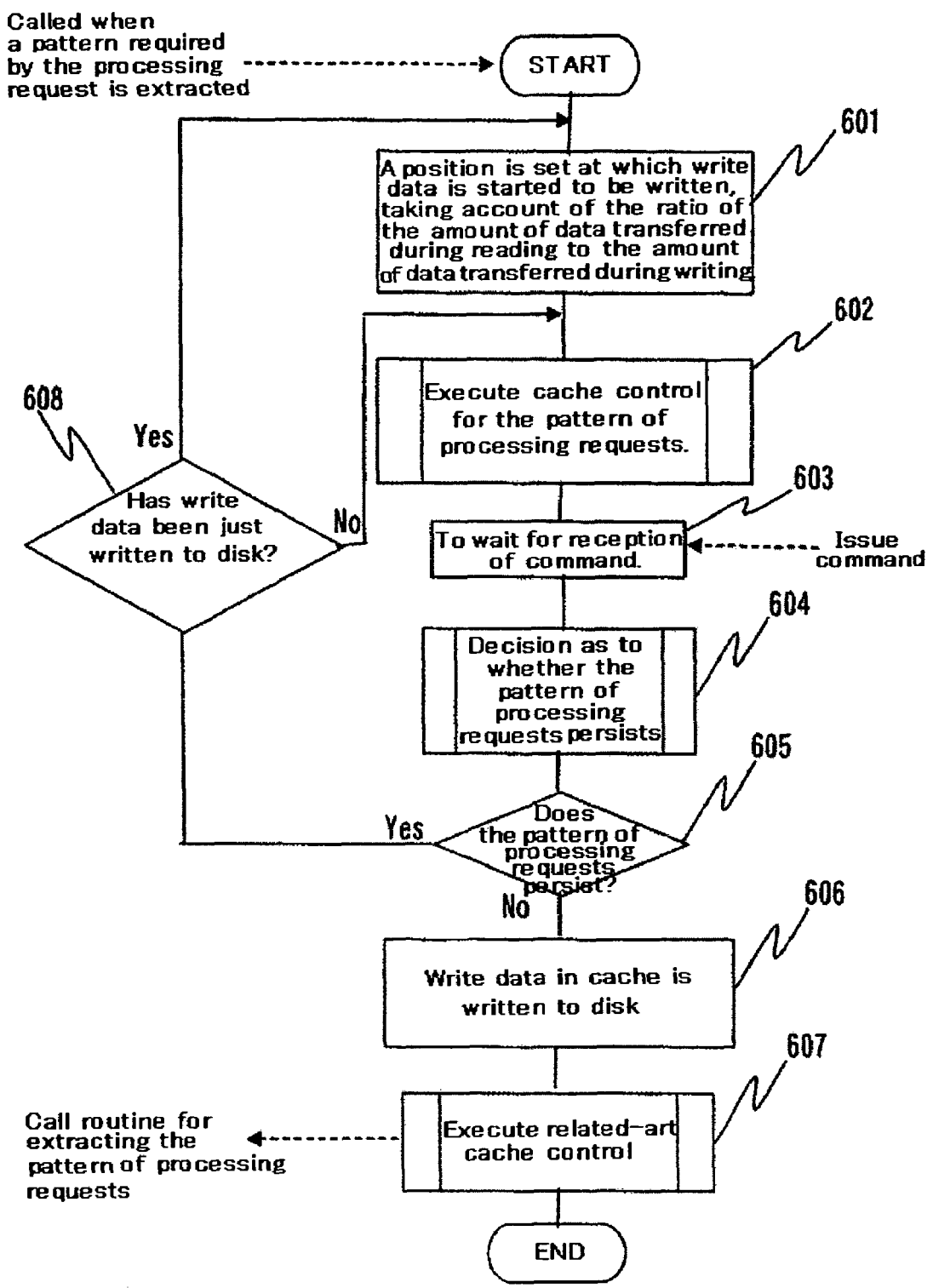
FIG. 6 is a flowchart illustrating a sequence of cache control operations according to the first embodiment.

FIG. 6 is a flowchart illustrating a sequence of control operations performed in a case where a processing request pattern is extracted, if in the request pattern, read requests making access to continuous areas in the LBA space repeatedly alternate with write requests making access to continuous or non-continuous areas in the LBA space. When the above-described pattern of processing requests is extracted, the HDC 107 sets the position at which write data is started to be written, taking account of the ratio of the capacity of data transferred to the cache during reading to the capacity of data transferred to the cache during writing (step 601). For example, where the ratio of the capacity of data transferred during reading to the capacity of data transferred during writing is 1:1, the position at which write data is started to be written is set identical with the position at which read data is started to be written. Where the ratio between the two capacities is 1:2, the position at which write data is started to be written is set to a position obtained by subtracting an amount equal to a half of the cache size from the position at which read data is started to be written. Since data is written by the wrap round method, if the result of the subtraction is negative, it is necessary to find the position at which data is started to be written, by subtracting the amount of the negative part from the maximum address of the cache.

Figure 7:
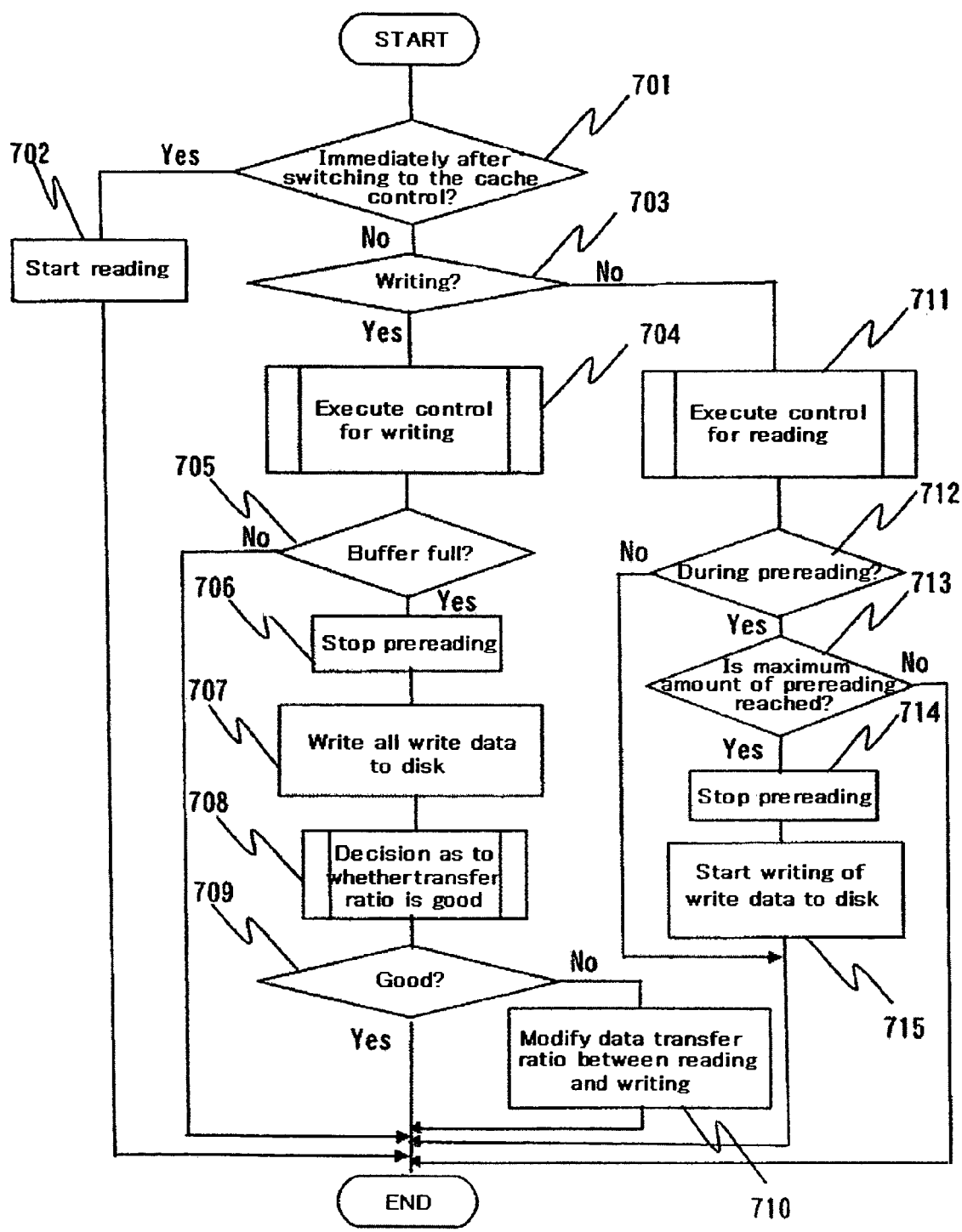
FIG. 7 is a flowchart particularly illustrating a sequence of cache control operations according to the first embodiment.
Figure 8:
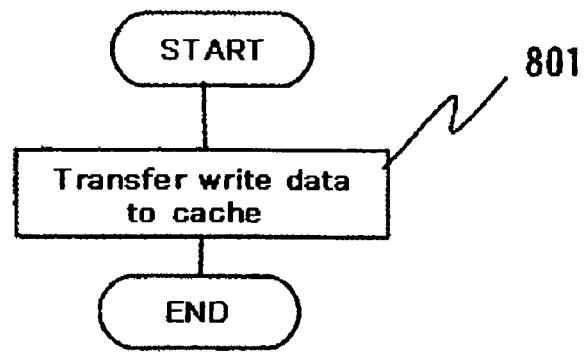
FIG. 8 is a flowchart illustrating a cache-write operation.

Then, cache control for this pattern of processing requests is performed (step 602). A sequence of operations in response to this pattern of processing requests under the cache control is illustrated in FIG. 7. A check is done to see whether the processing has been just switched to the cache control (step 701). If the decision is affirmative (YES), reading is started (step 702). If the decision is negative (NO), a check is made to determine whether the processing is writing (step 703). If so, control for writing is executed (step 704). A sequence of operations for achieving the control for writing is illustrated in FIG. 8. In control for writing, write data is transferred to the cache (step 801). Control returns to step 704 of FIG. 7. If the buffer becomes full during cache control for writing (step 705), prereading is stopped (step 706). All the buffered write data is written onto the disk (step 707). Then, a decision is made as to whether the transfer ratio is appropriate (step 708).

Figure 9:
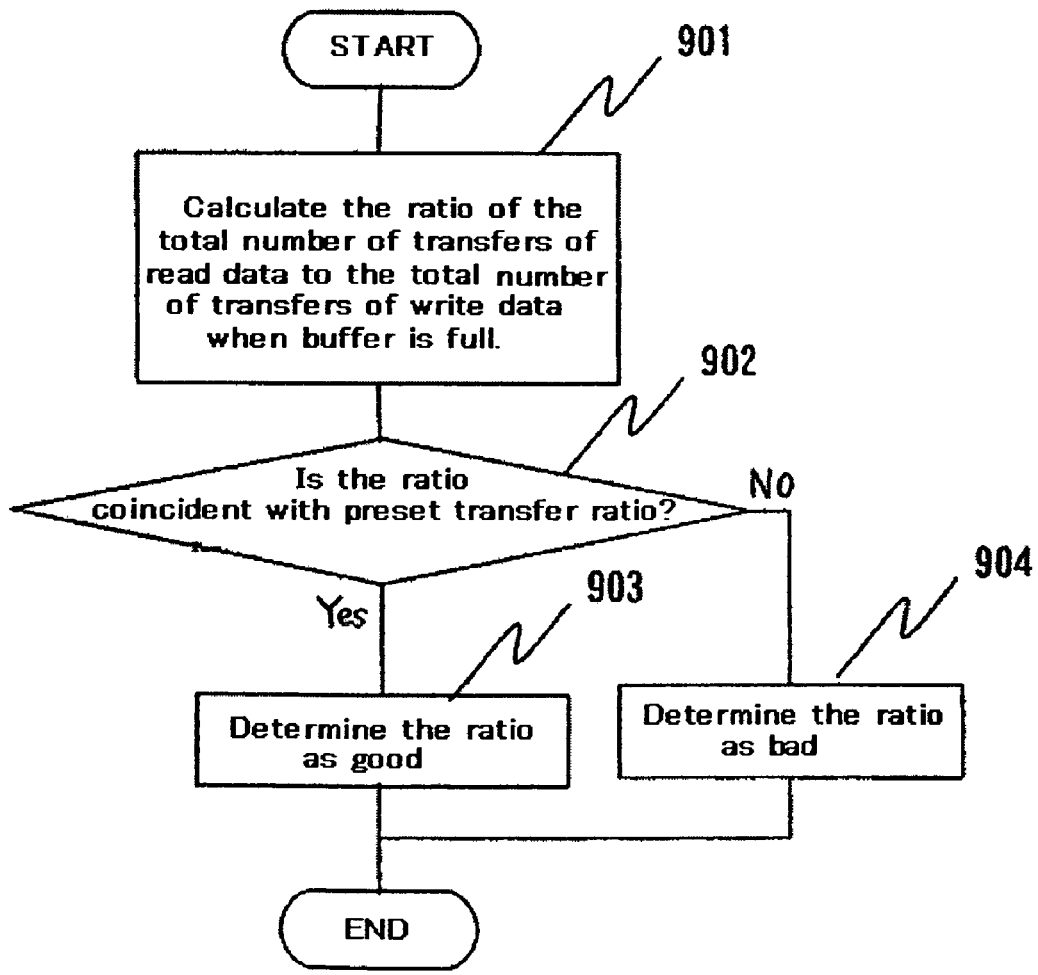
FIG. 9 is a flowchart illustrating a sequence of operations for making a decision as to whether the data transfer ratio is appropriate or not.

FIG. 9 is a flowchart illustrating a sequence of operations for making a decision as to whether the transfer ratio is appropriate. The ratio of the total number of transfers of read data to the total number of transfers of write data when the decision as to whether the buffer is full is made is calculated in this decision as to whether the transfer ratio is appropriate (step 901). The result is compared with the preset transfer ratio (step 902). If the result of the comparison indicates that the ratio agrees with the preset ratio, the ratio is determined as appropriate (step 903). If the ratio does not agree with the preset ratio, the ratio is determined as inappropriate (step 904). Control returns to step 708 of FIG. 7. If the result of the decision as to whether the transfer ratio is appropriate is not appropriate (step 709), the ratio of the number of transfers made during reading to the number of transfers made during writing is modified to the ratio of the total number of transfers of read data to the total number of transfers of write data when the decision is made as to whether the buffer is full (step 710).

Figure 10:
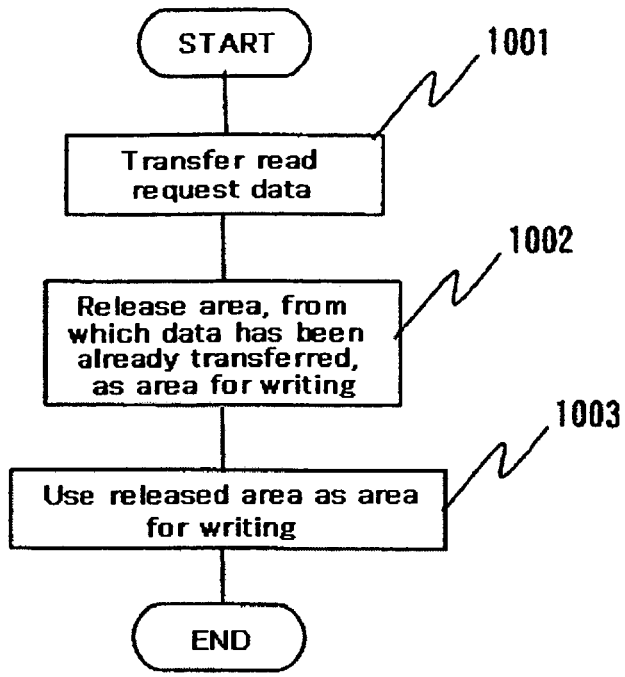
FIG. 10 is a flowchart illustrating a sequence of cache-read operations.

If the result made in step 703 indicates that the processing is not writing, control for reading is executed (step 711). FIG. 10 is a flowchart illustrating a sequence of operations for executing control for reading. Data about a read request is transferred to the host (step 1001). After the transfer, the area from which the data has been transferred is released as an area for writing (step 1002). The released area is used as an area for writing (step 1003).

Figure 11:
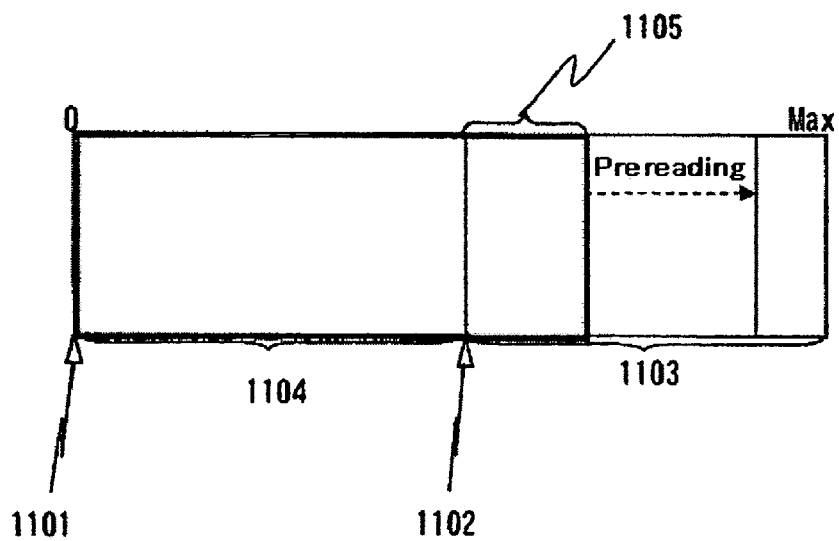
FIG. 11 is a diagram illustrating a cache operation performed when cache areas for reading are used as cache areas for writing under cache control according to the first embodiment.

FIG. 11 shows an example of operation of the cache when the cache area for reading is released as a cache area for writing. In this example of FIG. 11, the ratio of the number of transfers of data during reading making access to continuous areas in the LBA space to the number of transfers of data during writing making access to continuous or non-continuous areas in the LBA space is 1:2. Therefore, the position 1101 at which write data is started to be transferred is set to a position that is obtained by subtracting a half (½) of the cache size from the position 1102 at which read data is started to be transferred. At the beginning of the execution of the cache control, a half (½) of the whole cache area is secured as each of area 1103 for reading and area 1104 for writing. However, when prereading is in progress, if the data about a read request is transferred to the host, an area 1105 corresponding to the data transferred to the host is released as an area for writing. Therefore, as long as a processing request utilizing the cache control of the present embodiment persists, the area 1103 for reading decreases to 0 at minimum. Meanwhile, the area 1104 for writing increases to the size of the cache area at maximum.

Control returns to the step 711 of FIG. 7. A check is performed as to whether prereading is in progress (step 712). If so, a check is performed as to whether a maximum amount of previously read data has been reached (step 713). If so, the prereading is stopped (step 714). Then, buffered write data is started to be written onto the disk (step 715).

Figure 12:
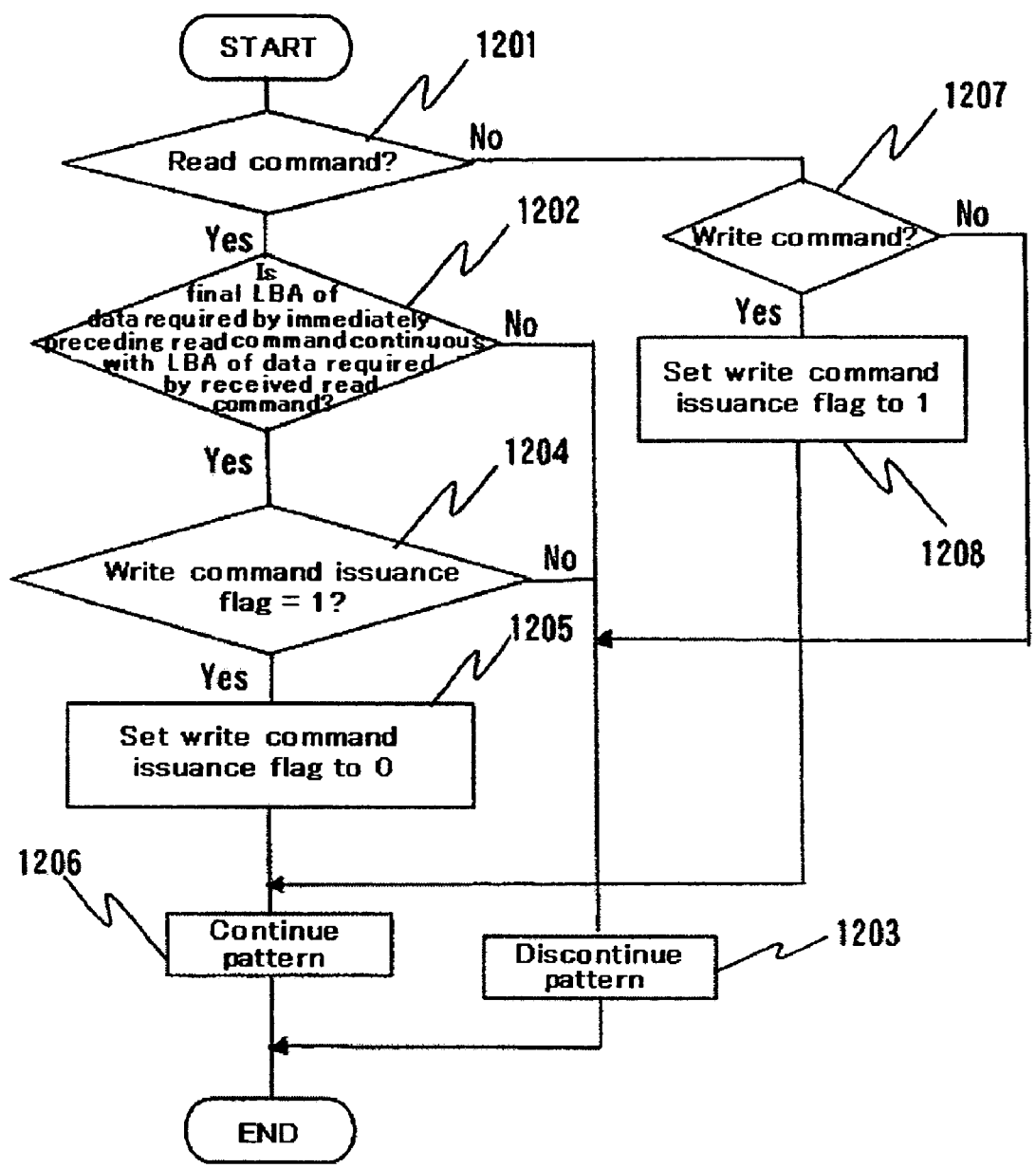
FIG. 12 is a flowchart illustrating a sequence of operations for making a decision as to whether a pattern of processing requests utilizing cache control according to the first embodiment persists.
Figure 1:
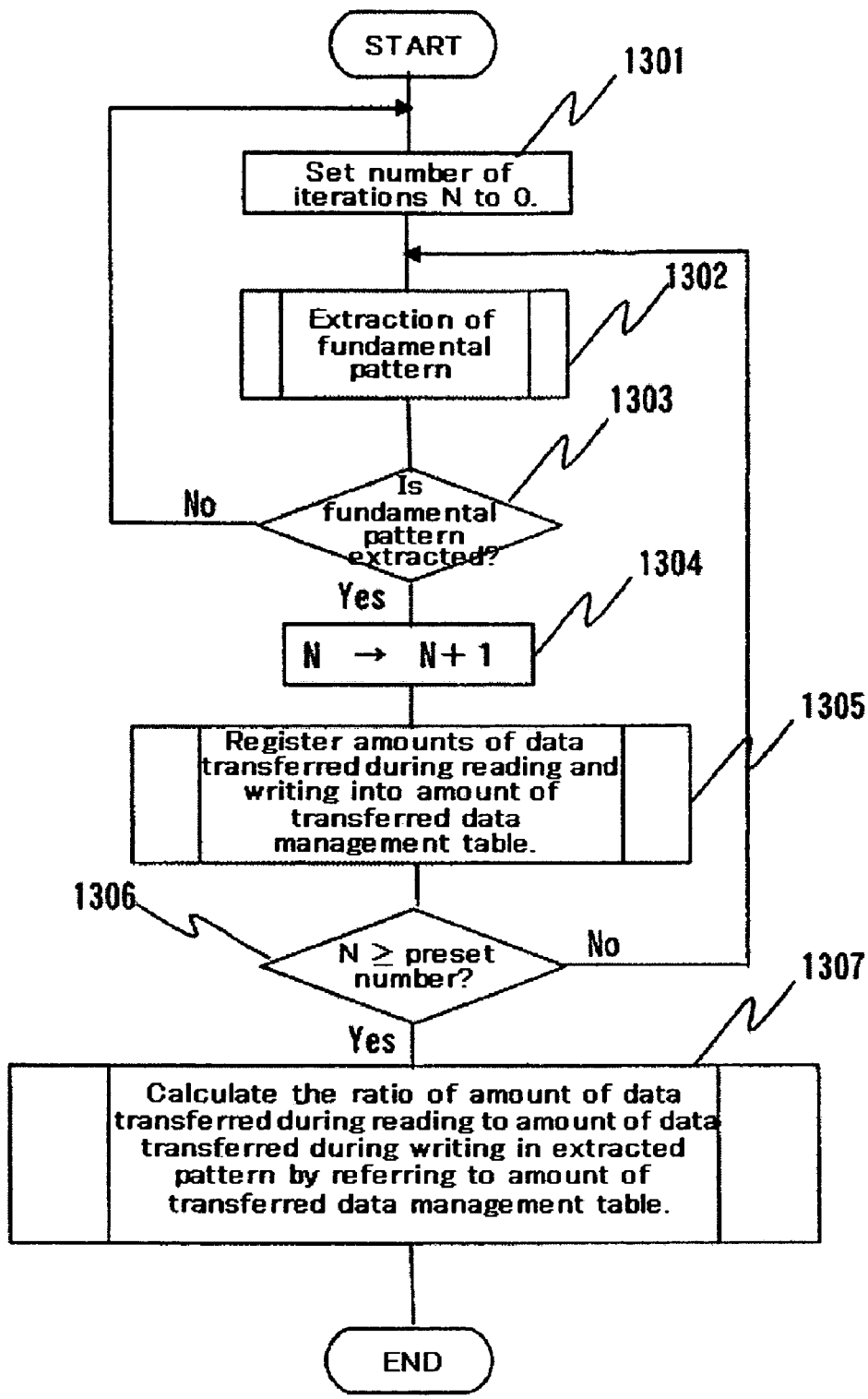

Control returns to step 602 of FIG. 6, where the cache control is executed. Then, if a next command is received during waiting for reception of a command (step 603), a decision is made as to whether this pattern of processing requests persists (step 604). FIG. 12 is a flowchart illustrating a decision made as to whether this pattern of processing requests persists. A check is performed to see if the command is a read command (step 1201). If so, a check is performed as to whether the final LBA of the data required by the immediately preceding read command is continuous with the LBA of the data required by the received read command (step 1202). If they are not continuous, the pattern is determined as non-continuous (step 1203). If they are continuous, a check is performed as to whether a write command issuance flag is set to 1 (step 1204). If so, the write command issuance flag is set to 0 (step 1205) to continue the pattern (step 1206). Control returns to step 1204, where the pattern is not continued unless the write command issuance flag is 1 (step 1203). Control returns to step 1201. If the command is not a read command, a check is performed as to whether the command is a write command (step 1207). If the command is a write command, the write command issuance flag is set to 1 (step 1208). The pattern is continued (step 1206). Control returns to step 1207. A check is performed as to whether the command is a write command. If the command is not a write command, the pattern is not continued (step 1203).

Returning to step 604 of FIG. 6, a check is performed as to whether the pattern of processing requests still persists after the execution of the decision as to whether the pattern of processing requests persists (step 605). If the pattern does not persist, the write data in the cache is written onto the disk (step 606). Then, the related art cache control is executed (step 607). If the decision at step 605 is that the pattern of processing requests persists, a check is performed as to whether write data has been just written onto the disk (step 608). If so, the position at which write data is started to be written is reset (step 601). If not so, cache control for the pattern of processing requests is executed (step 602).

Figure 14:
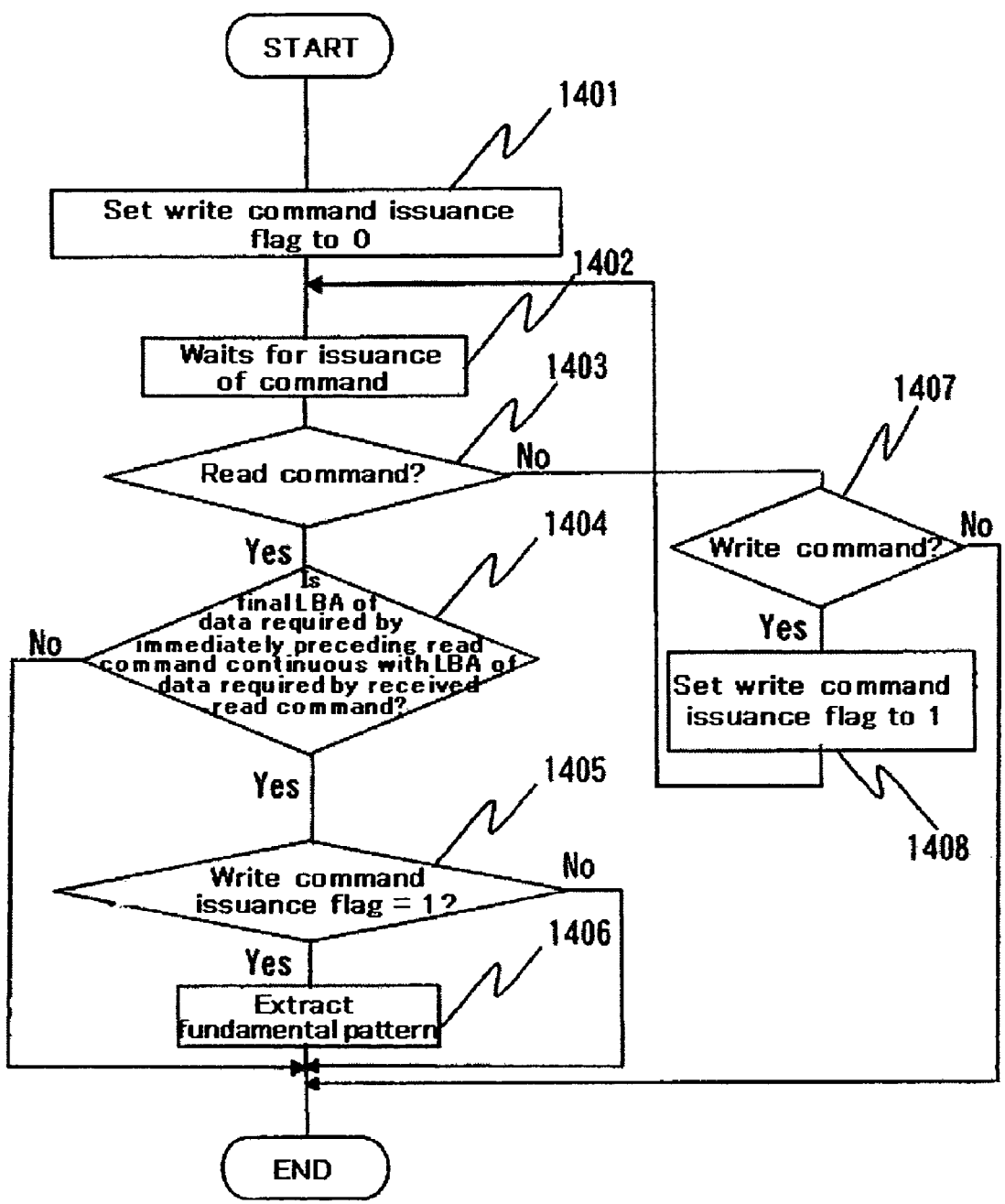
FIG. 14 is a flowchart illustrating a sequence of operations for extracting a fundamental pattern from patterns of processing requests to which cache control according to the first embodiment is applied.

FIG. 13 is a flowchart illustrating processing for extracting a processing request according to which read requests making access to continuous areas in the LBA space utilizing the cache control of the present embodiment repeatedly alternate with write requests making access to continuous or non-continuous areas in the LBA space. In this extracting processing, at least one write command is issued between read commands making access to continuous areas in the LBA space. This is the fundamental pattern. If this fundamental pattern is extracted N times, it is determined that the pattern has been extracted. The number of iterations N is set to 0 (step 1301). Processing for extracting the fundamental pattern is performed (step 1302). FIG. 14 is a flowchart illustrating the processing for extracting the fundamental pattern. The write command issuance flag is set to 0 (step 1401). Control waits until the next command is issued (step 1402). A check is performed as to whether the received command is a read command (step 1403). If so, a check is performed as to whether the final LBA of the data required by the immediately preceding read command is continuous with the LBA of the data required by the received command (step 1404). If so, a check is performed as to whether the write command issuance flag is set to 1 (step 1405). If so, the fundamental pattern is extracted (step 1406). If the flag is not set to 1, the processing is ended.

If the decision at step 1404 is that they are not continuous, the processing is ended. If the decision at step 1403 is that the command is not a read command, a check is performed as to whether the command is a write command (step 1407). If the command is a write command, the write command issuance flag is set to 1 (step 1408). If the command is not a write command, the processing is ended.

Figures 15, 16:
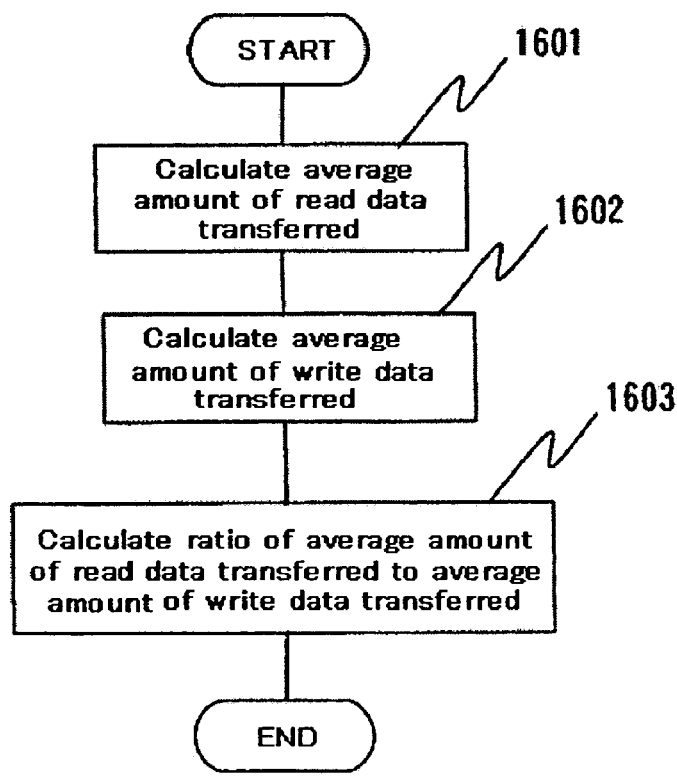
FIG. 15 is a table showing an example of the configuration of an amount of transferred data management table for managing the amount of transferred data in the fundamental pattern of patterns of processing requests to which cache control according to the first embodiment is applied.
FIG. 16 is a flowchart illustrating a sequence of operations for calculating the ratio of the amount of data transferred during reading to the amount of data transferred during writing in a pattern of processing requests to which cache control according to the first embodiment is applied.

Control returns to the step 1302 of FIG. 13, where the processing for extracting the fundamental pattern is executed. If the fundamental pattern is extracted (step 1303), the number of times that the fundamental pattern is extracted is counted (step 1304). The amount of data transferred during reading and the amount of data transferred during writing are registered into an amount of transferred data management table in the fundamental pattern (step 1305). An example of the configuration of this management table is shown in FIG. 15. The management table consists of the number of times that the fundamental pattern is extracted, the amount of transferred data (given in terms of the number of sectors) in response to a read command during extraction of the fundamental pattern, and the total amount of data transferred (the number of sectors) in response to write commands received from the instant when a read command immediately preceding the present read command is received to the instant when the read command is received. The management table is created in the hard disk controller 107, cache memory 105, or RAM 102.

Control returns to the step 1306 of FIG. 13, where a check is then performed as to whether the number of iterations N of the fundamental pattern has reached a preset number. If the number is reached, the ratio of the amount of data transferred during reading to the amount of data transferred during writing in the extracted pattern is calculated by referring to the amount of transferred data management table of FIG. 15 (step 1307). FIG. 16 is a flowchart illustrating processing for calculating the ratio of the amount of data transferred during reading to the amount of data transferred during writing in the extracted pattern. First, the average amount of transferred read data is calculated by referring to the data in the amount of transferred data management table (step 1601). Then, the average amount of transferred write data is calculated (step 1602). Subsequently, the ratio of the average amount of transferred data during reading to the average amount of transferred data during writing is calculated (step 1603).

FIG. 17 shows an example of a command used to provide a notice from the host to the disk drive that reading making access to continuous areas in the LBA space and writing making access to continuous or non-continuous areas in the LBA space are executed in parallel. In the present embodiment, an example in which a SET FEATURES command is used as the above-described command is given. EFh code 1701 showing a SET FEATURES command is written into a command register. 8Bh 1702 is set as a sub-command code into a features register, the code providing a notice that reading making access to continuous areas in the LBA space and writing making access to continuous or non-continuous areas in the LBA space are executed in parallel. At the beginning of the processing, "01h" is loaded into a sector count register. When the processing ends, "00h" is loaded into the register. The ratio of the amount of data transferred during reading to the amount of data transferred during writing is loaded into an LBA Low register. Bits 0 to 3 (1703) of the LBA Low register set the ratio of the amount of data transferred during reading. Bits 4 to 7 (1704) of the LBA Low register set the ratio of the amount of data transferred during writing. For example, if the amount of data transferred to the cache during reading is the same as the amount of data transferred to the cache during writing, "0001" is set to bits 0 to 3 of the LBA Low register (1703). Also, "0001" is set to bits 4 to 7 of the LBA Low register (1704). When the end of the processing is set, 0 is loaded into the LBA Low register. LBA Mid and LBA High registers are not required to be set. Bit 4 (1705) of the device register is set to the number of the selected device (0 for the master and 1 for the slave). Also, bits 0 to 3 of the device register and bit 6 are not required to be set. Bits 5 and 7 of the device register have been abolished.

Figure 18:
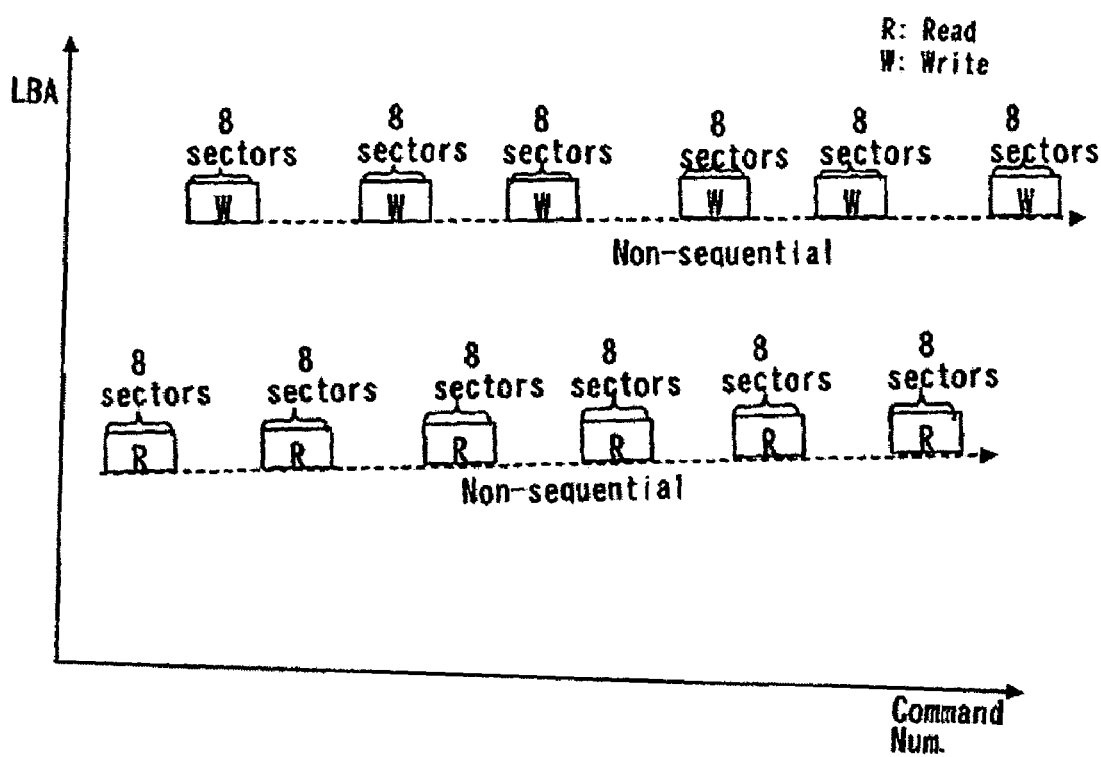
FIG. 18 is a diagram illustrating an example of pattern of processing requests to which cache control according to a second embodiment of the present invention is applied.

It is a second aspect of the present invention to provide an improved processing speed in a case where read requests making access to areas located within a given distance in the positive direction of the LBAs repeatedly alternate with write requests making access to continuous or non-continuous areas in the LBA space in a single ring method capable of setting areas for reading and writing, respectively, as the need arises. FIG. 18 shows an example of processing of host requests to which cache control according to the second embodiment is applied. In FIG. 18, logical block address (LBA) is plotted on the vertical axis, while the command issuance number is on the horizontal axis. In the example of FIG. 18, read commands R and write commands W are alternately issued. Neither read requests nor write requests make access to continuous areas in the LBA space. However, both kinds of requests make access at a given distance in the positive direction in the LBA space. Read commands R and write commands W require a size of transferred data of 8 sectors.

One of the features of the above-described processing requests which are produced when the cache control of the present embodiment is activated is that processing requests made by a series of read commands make access to areas located within a given distance in the positive direction of the LBA space and that write commands are issued between any two adjacent read commands making access to areas located within a given distance in the positive direction of the LBA space. Note that the amount of transferred data required by a read command does not need to be equal to the amount of transferred data required by a write command.

In a case where read requests making access to continuous areas in the LBA space of the first embodiment described above repeatedly alternate with write requests making access to continuous or non-continuous areas in the LBA space and also in a case where read requests making access to areas located in a given distance in the positive direction of the LBAs of the present embodiment repeatedly alternate with write requests making access to continuous or non-continuous areas in the LBA space, the cache control is identical with the cache control shown in FIGS. 6, 7, and 13. In the following description, those portions of the processing are explained which are different from the cache control described in the first embodiment and processing for extracting a pattern to which the cache control is applied.

Figure 19:
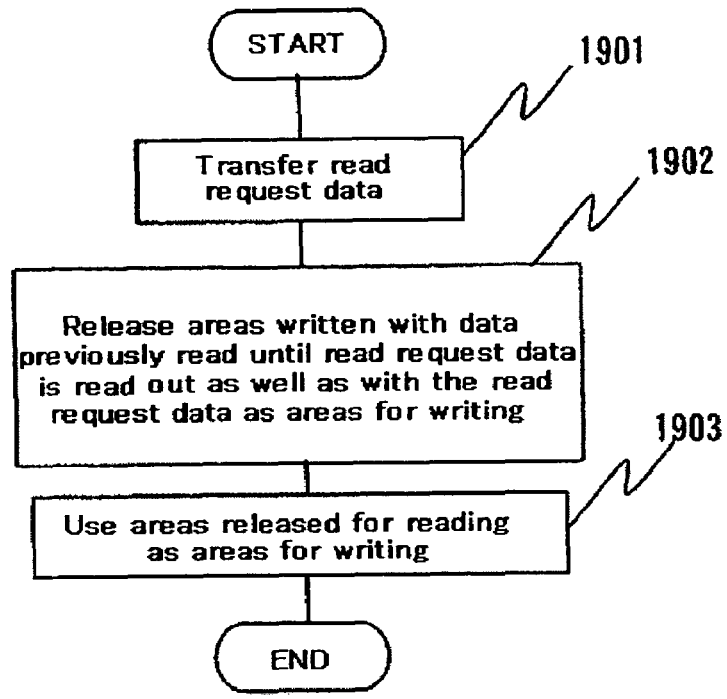
FIG. 19 is a flowchart illustrating a sequence of cache operations (read operations) according to the second embodiment.

FIG. 19 is a flowchart illustrating the control of reading processing under cache control in a case where read requests making access to areas located within a given distance in the positive direction of the LBAs repeatedly alternate with write requests making access to continuous or non-continuous areas in the LBA space. Data required by read commands received during prereading is transferred to the host (step 1901). Then, areas written with the data required by the read commands and with data previously read until the data required by the read commands is read out are released as areas for writing (step 1902).

Figure 20:
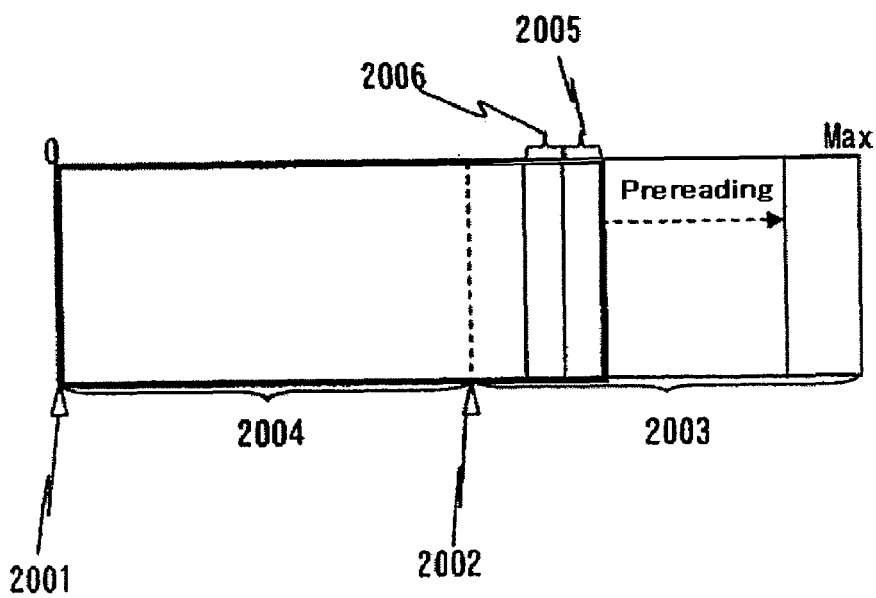
FIG. 20 is a diagram illustrating a cache operation performed when cache areas for reading are used as cache areas for writing under the cache control according to the second embodiment.

An example of the operation under the cache control when the areas for reading are released as areas for writing is shown in FIG. 20. In the example of FIG. 20, the ratio of the amount of data transferred during reading making access to the areas located within a given distance in the positive direction of the LBAs to the amount of data transferred during writing making access to continuous or non-continuous areas in the LBA space is 1:2. Therefore, the position 2001 at which write data is started to be transferred is set to a position obtained by subtracting a half (½) of the cache area size from the position 2002 at which read data is started to be transferred. Accordingly, the size of each of area 2003 for reading and area 2004 for writing is a half (½) of the size of the whole cache area when the present cache control is started. Where there is a read request, data 2005 about the read request is transferred from the cache to the host. The areas written with the data 2005 about the read request and with data 2006 previously read until the data about the read request is read out are released as areas for writing. Control returns to the flow routine of FIG. 19. The released areas for reading are then used as areas for writing (step 1903).

The difference with the case where read requests making access to continuous areas in the LBA space repeatedly alternate with write requests making access to continuous or non-continuous areas in the LBA space is that areas written with data previously read until the data about the read request is read out are released together with the areas written with the data about the read request.

FIG. 21 is a flowchart illustrating a sequence of operations for making a decision as to whether the pattern persists in which read requests making access to areas located at short distances in the positive direction of the LBAs repeatedly alternate with write requests making access to continuous or non-continuous areas in the LBA space. A check is performed as to whether the command is a read command (step 2101). If so, a check is performed as to whether there is any access that is made, in the positive direction and within a given distance, to the final LBA of the data required by the immediately preceding read command (step 2102). If there is no such access, the pattern is not continued (step 2103). If there is such access, a check is performed as to whether the write command issuance flag is set to 1 (step 2104). If so, the write command issuance flag is set to 0 (step 2105), and the pattern is continued (step 2106). If the decision at step 2104 is that the write command issuance flag is not set to 1, the pattern is not continued (step 2103).

Control returns to step 2101. If the command is not a read command, a check is performed as to whether the command is a write command (step 2107). If it is a write command, the write command issuance flag is set to 1 (step 2108). The pattern is continued (step 2106). If the decision at step 2107 is that the command is not a write command, the pattern is not continued (step 2103). In the decision illustrated in the flowchart of FIG. 21, the pattern is continued on condition that a read request is making access to areas located within a given distance in the positive direction relative to the final LBA of the data required by the immediately preceding read command. This distance may be replaced by the amount of rotation of the disk (number of sectors) obtained by converting the shortest seek time or shortest access time when processing of write commands queued is attempted to be started based on sectors per track (SPT) of the zone at which the present head sits.

FIG. 22 is a flowchart of a sequence of operations for calculating the aforementioned given distance based on the shortest seek time in a case where processing of write commands queued is attempted to be started from the present position of head. Where write commands queued are attempted to be executed from the present position of head, the shortest seek time is found (step 2201). Then, the amount of rotation (number of sectors) enabled in the seek time is calculated using the SPT of the zone where the present head sits (step 2202). That is, the amount of rotation is calculated as "the seek time/1 rotation time×SPT". Then, the amount of rotation is taken as the distance used in the decision made as to whether the pattern of processing requests is continued (step 2203).

Figure 23:
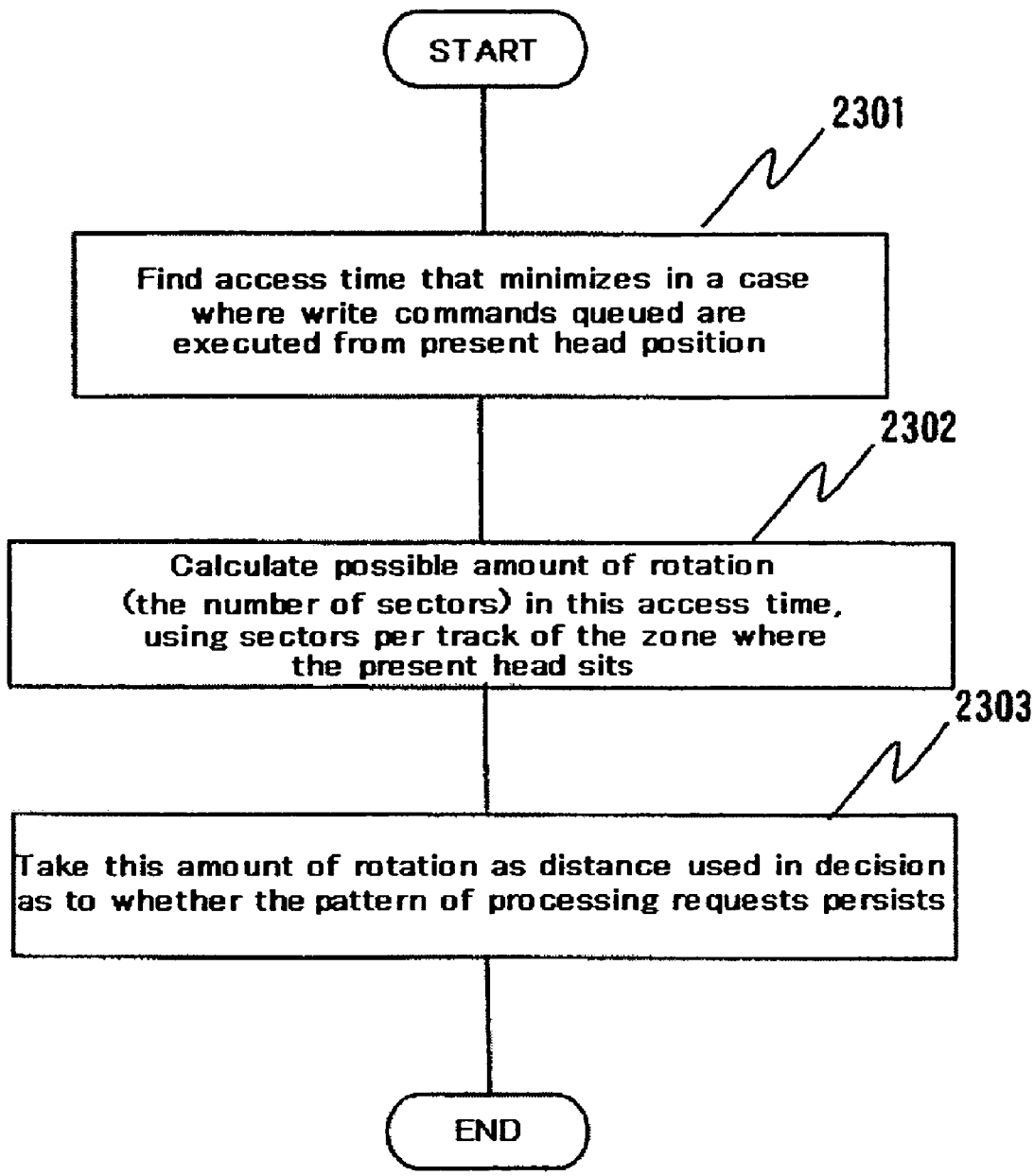
FIG. 23 is a flowchart illustrating a sequence of operations for calculating a distance which is given by the number of sectors and which provides a basis for making a decision as to whether a pattern of processing requests utilizing cache control according to the second embodiment persists.

FIG. 23 is a flowchart illustrating a sequence of operations for calculating the above-described given distance based on the shortest access time in a case where the processing of write commands queued is attempted to be started from the present head position. Where write commands queued are attempted to be executed from the present head position, the shortest access time is found (step 2301). The access time is given by "seek time+rotation wait time". Then, the amount of rotation (number of sectors) that can be made in this access time is calculated using the SPT of the zone at which the present head sits (step 2302). That is, the amount of rotation is given by "access time/1 rotation time×SPT". The amount of rotation is taken as the distance used in the decision made as to whether the pattern of processing requests is continued (step 2303).

Figure 24:
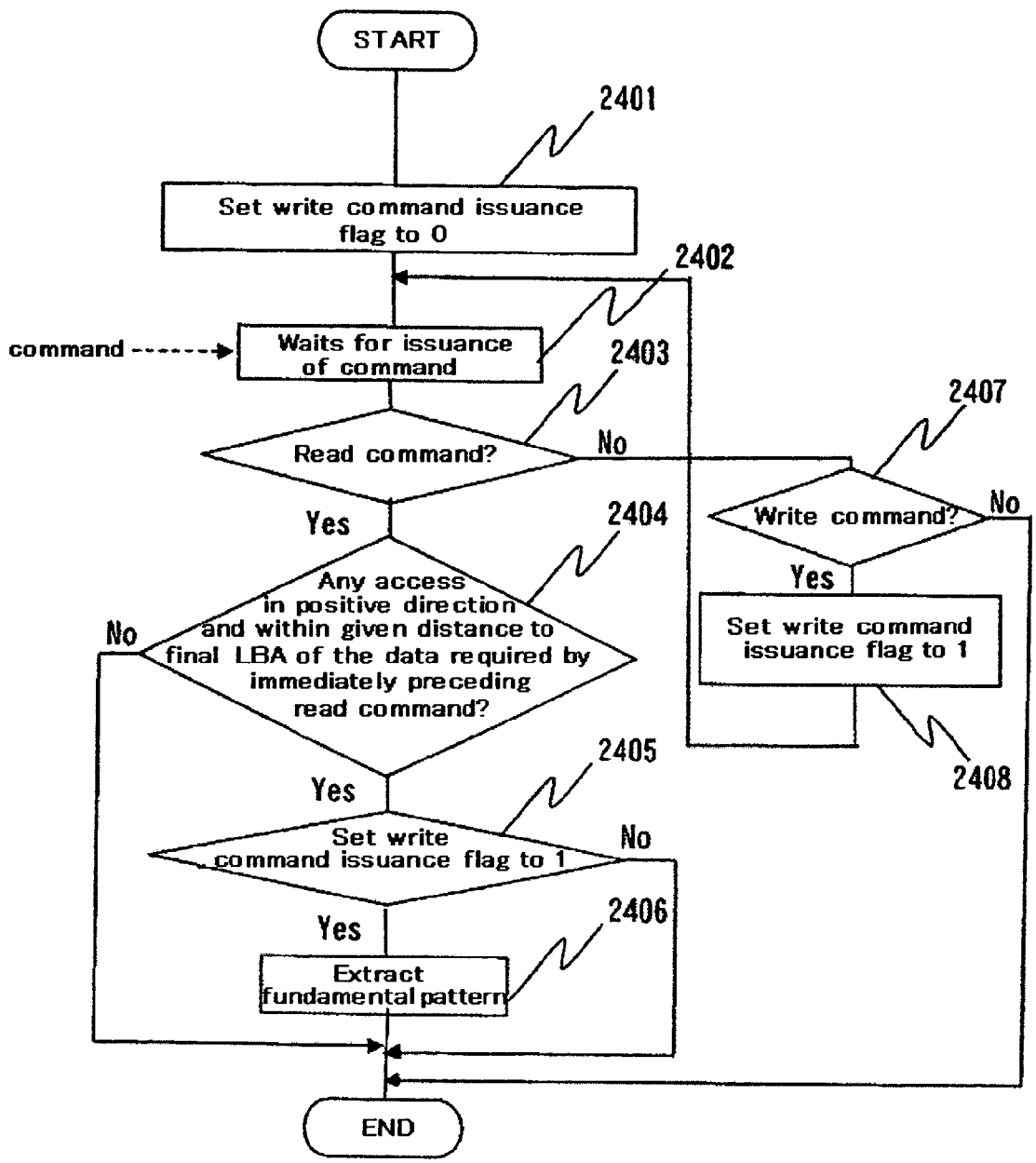
FIG. 24 is a flowchart illustrating a sequence of operations for extracting a fundamental pattern of patterns of processing requests to which cache control according to the second embodiment is applied.

FIG. 24 is a flowchart illustrating a sequence of operations for extracting a pattern in which read requests making access to areas located within a given distance in the positive direction of the LBAs repeatedly alternate with write requests making access to continuous or non-continuous areas in the LBA space. A write command issuance flag is set to 0 (step 2401). Then, issuance of a command is waited (step 2402). A check is performed as to whether the received command is a read command (step 2403). If it is a read command, a check is performed as to whether there is any access to areas located within a given distance in the positive direction relative to the final LBA of the data required by the immediately preceding read command (step 2404). If so, a check is performed as to whether the write command issuance flag is set to 1 (step 2405). If the flag is not set to 1, the processing is ended. If the flag is set to 1, a fundamental pattern is extracted (step 2406). If the decision at step 2404 is negative (i.e., not making access to any area within the given distance), the processing is ended.

Control returns to step 2403. If the command is not a read command, a check is performed as to whether the command is a write command (step 2407). If the command is a write command, the write command issuance flag is set to 1 (step 2408). Issuance of the next command is waited (step 2402). If the command is not a write command, the processing is ended. When the fundamental pattern is extracted, the amount of data transferred during reading and the amount of data transferred during writing in the fundamental pattern are registered in the amount of transferred data management table.

An example of the configuration of the amount of transferred data management table is shown in FIG. 25. The management table consists of (1) the number of times that fundamental pattern is extracted, (2) the sum of the amount of data (the number of sectors) required by read commands when the fundamental pattern is extracted and the amount of data (the number of sectors) previously read until the required data is read out, and (3) the amount of data (the number of sectors) transferred during writing in the fundamental pattern. The ratio of the amount of data transferred during reading to the amount of data transferred during writing when a processing requesting pattern utilizing the cache control is extracted is found by the processing illustrated in FIG. 16, using the table of FIG. 25. The management table is created in the hard disk controller (HDC) 107, cache memory 105, or RAM 102.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method of controlling a cache memory in a disk drive, comprising:
   extracting a pattern of processing requests in which read requests making access to continuous areas in a logical block address (LBA) space on a disk repeatedly alternate with write requests making access to continuous or non-continuous areas in the LBA space;
   setting a position at which data about writing is started to be written to the cache memory, based on the ratio of the amount of data transferred to the cache memory during reading to the amount of data transferred to the cache memory during writing;
   executing cache control for the pattern of processing requests;
   making a decision as to whether the pattern of processing requests persists when a new processing request is received;
   making a decision as to whether data about writing has been just written to the disk if the pattern of processing requests persists;
   executing the cache control for the pattern of processing requests unless the data about writing has been just written to the disk; and
   resetting the position at which data about writing is started to be written to the cache memory if the data about writing has been just written to the disk.

2. A method of controlling a cache memory in a disk drive as set forth in claim 1, wherein making a decision as to whether the pattern of processing requests persists includes:
   performing a check as to whether each processing request is a read request;
   performing a check as to whether the final LBA of data required by an immediately preceding read request is continuous with the LBA of the data required by the first-mentioned read request if the decision at the immediately preceding step is YES;
   performing a check as to whether a write request issuance flag is set to 1 if the decision at the immediately preceding step is YES;
   setting the write request issuance flag to 0 if the decision at the immediately preceding step is YES;
   then determining the pattern of processing requests as persisting; and
   setting the write request flag to 1 if the processing request is a write request.

3. A method of controlling a cache memory in a disk drive as set forth in claim 1, wherein extracting the pattern of processing requests includes:
   setting the write request issuance flag to 0;
   performing a check as to whether each processing request is a read request;
   performing a check as to whether the final LBA of data required by an immediately preceding read request is continuous with the LBA of the data required by the first-mentioned read request if the decision at the immediately preceding step is YES;
   performing a check as to whether the write request issuance flag is set to 1 if the decision at the immediately preceding step is YES;
   extracting the present pattern as the pattern of processing request if the decision at the immediately preceding step is YES; and
   setting the write request issuance flag to 1 if the processing request is a write request.

4. A method of controlling a cache memory in a disk drive, comprising:
   extracting a pattern of processing requests in which read requests making access to a space located within a given distance in the positive direction of logical block addresses (LBAs) on a disk repeatedly alternate with write requests making access to continuous or non-continuous areas in the LBA space;
   setting a position at which data about writing is started to be written to the cache memory, based on the ratio of the amount of data transferred to the cache memory during reading to the amount of data transferred to the cache memory during writing;
   executing cache control for the pattern of processing requests;
   making a decision as to whether the pattern of processing requests persists when a new processing request is received;
   making a decision as to whether data about writing has been just written to the disk if the decision at the immediately preceding step is YES;
   executing the cache control for the pattern of processing requests unless the data about writing has been just written to the disk; and
   resetting the position at which data about writing is started to be written to the cache memory if the data about writing has been just written to the disk;
   wherein making a decision as to whether the pattern of processing requests persists when the new processing request is received includes:
   performing a check as to whether each processing request is a read request;
   performing a check as to whether there is any access to the final LBA of data required by the immediately preceding read request located within a given distance from the final LBA in the positive direction if the decision at the immediately preceding step is YES; and
   determining the pattern of the processing request as persisting if the decision at the immediately preceding step is YES.

5. A method of controlling a cache memory in a disk drive as set forth in claim 4, wherein extracting the pattern of processing requests takes a pattern in which a write command is issued between read commands making access to continuous areas in the LBA space as a fundamental pattern and extracts the pattern of processing requests in a case where the fundamental pattern is extracted a given number of times, the method further comprising:
   extracting the fundamental pattern;
   counting the number of times that the fundamental pattern is extracted; and
   making a decision as to whether the counted number of times has reached a given number.

* * * * *